Patented Dec. 14, 1926.

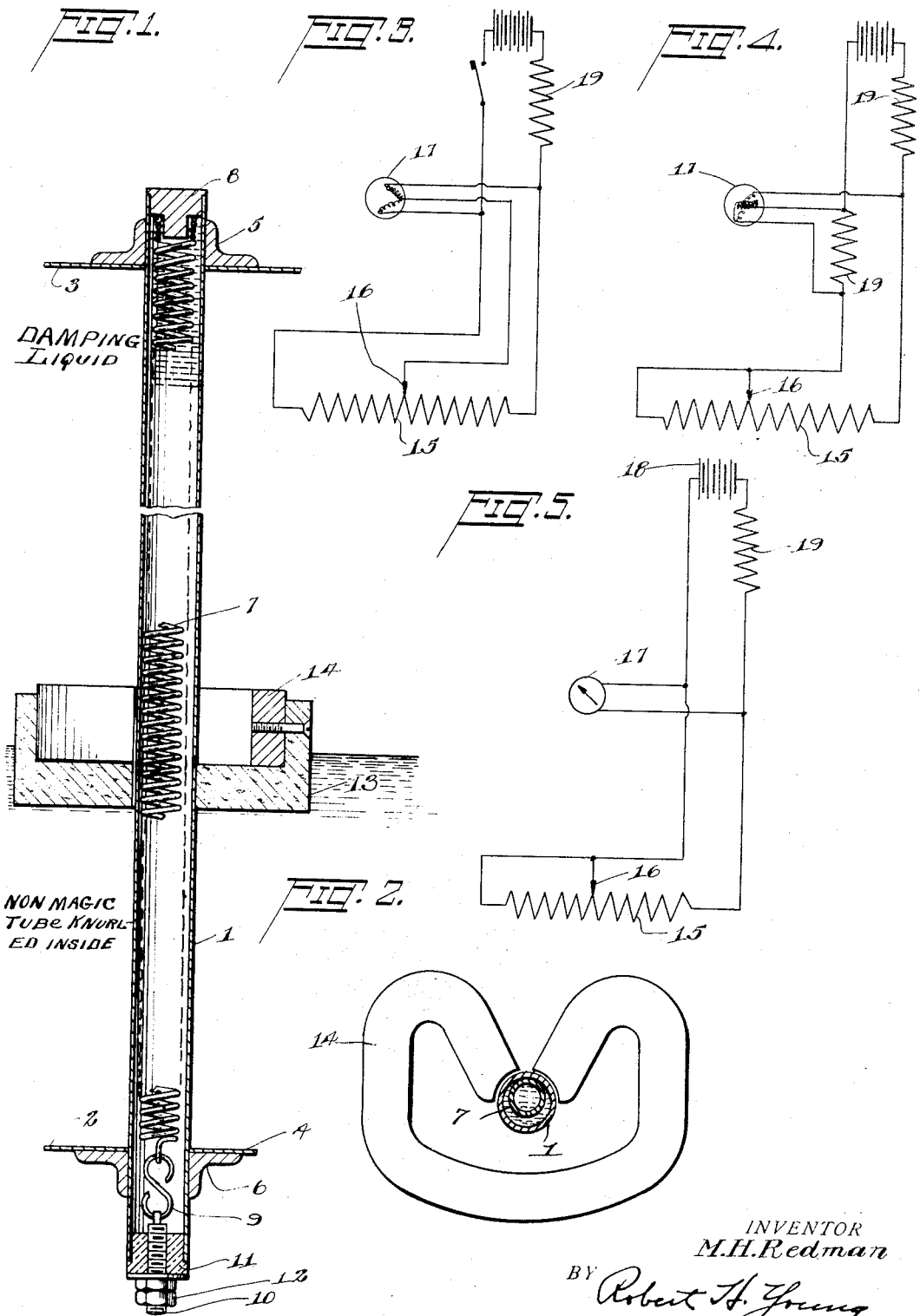

1,610,591

UNITED STATES PATENT OFFICE.

MARK H. REDMAN, OF DAYTON, OHIO.

LIQUID-LEVEL INDICATOR.

Application filed April 18, 1924. Serial No. 707,382.

This invention relates to liquid level indicators, and the main object is to provide a liquid level indicator in which a combined magnetic and electrical circuit is utilized for the remote indication of the level of the liquid in the container.

A further object is the arrangement of the magnetic and electrical circuits so that no electrical contacts will be made or broken in the container space.

A further object is the provision of a gauge which consists essentially of a spring of magnetic material which serves as a magnetic armature as well as an electrical resistance and contact.

Further objects will be more fully set forth in the attached specification, in the claims and in the drawings, in which:

Fig. 1 is a vertical section of the container showing the magnetic circuit.

Fig. 2 is a plan view of the magnet, and

Figs. 3, 4 and 5 are various electrical circuits which may be utilized with the magnetic circuit shown in Fig. 1.

Referring more particularly to the drawings, in which my invention is shown as having the form of a continuous direct reading gauge for automobile or airplane fuel tanks, a tube 1 of non-magnetic material is arranged vertically in a container or fuel tank 2 which has an upper wall 3 and a lower wall 4 to which the tube is attached by means of flanges 5 and 6 which are welded, soldered, or otherwise connected to both the walls of the tank and the tube 1 so that a fluid-tight joint is provided at the ends of the tube where it projects through the walls of the container.

Within the tube is a coil spring 7 slightly less in diameter than the inside of the tube and made of magnetic material, such as steel. This spring is suspended concentrically with respect to the tube at either end and maintained under tension to prevent the spring from touching the wall of the tube when the position departs from the vertical, except as controlled by the magnetic float. The upper end of the spring is attached to and maintained in position by an electrically conductive plug 8 which electrically interconnects the spring and the tube. At the lower end the spring is attached by means of a link 9 which is attached to the binding post 10 threaded in an insulating plug 11. An electrical connection is adapted to be made by means of the nuts 12 on the binding post 10, the insulating bushing electrically insulating the tube from the spring at this end. The binding post 10 being threaded within the insulating bushing forms a means of adjusting the tension of the spring if desired.

A suitable float 13 is provided around the tube and supports thereon a permanent magnet 14 so fixed in position that the locus of the center of curvature of the pole faces of the magnet describes a straight line which is in the center of the tube as the magnet is carried up and down by the float which rests upon the surface of the liquid and follows the variations of the liquid level. Sufficient clearance is allowed between the tube and the float assembly to allow free movement of the float up and down the tube which acts as a guide, and to permit rotational movements of the float assembly about the axis of the tube. The position and form of the magnet are such that a magnetic flux passes through the non-magnetic tube walls and through the spring 7, thus magnetizing the spring. This magnetization of the spring is appreciable at only the points adjacent to the pole faces of the magnet 14. The force of attraction between the magnetized spring and the permanent magnet is perpendicular to the axis of the tube and in the direction of the air gap between the poles of the permanent magnet. This force draws the spring against and in contact with the inner wall of the tube at a point opposite the permanent magnet pole faces, the magnet and float being so arranged that this point also coincides to the level of the liquid in the container. This contact is both physical and electrical. To facilitate the contacting between the walls of the tube and spring, the inner surface of the tube may be especially prepared by threading, knurling, etc. To reduce possible vibration of the spring which might cause undesirable making or breaking of the electrical circuit at an improper point, the tube is filled with suitable damping liquid of high viscosity. This liquid must have a high electrical resistance, should have non-corrosive qualities, and be unaffected by variations of temperature.

The mode of indicating the liquid level remotely is purely electrical. Considering the device as the electrical circuit, it will be seen that the continuous variation of the point of contacting of spring 7 and tube 1 is equivalent to a continuously variable resistance to a limit which is the total electrical resistance of the spring. This resistance variation takes place between the binding post 10 and nuts 12, and tube 1 which is electrically connected to the container. Figs. 3, 4 and 5 show various schematic electrical circuits which may be used in which the spring is designated by the number 15, and the point of contacting of the spring and the tube are represented by the arrows 16, the electrical gauge itself is shown at 17 and a suitable source of electromotive force is represented at 18. 19 represents fixed resistances.

Fig. 5 shows the simplest form of direct reading resistance measurement which is applicable when the variations in the supply potential are not prohibitive. In this method a change in the potential varies the accuracy proportionately. A small current is supplied by the battery 18 through the resistance 19 and through the variable resistance 15 which is quite small compared to the known resistance 19. Thus the current in the circuit is practically constant regardless of variations in the resistance of the spring and the potential drop across the resistance as indicated upon the meter 17 will be a measure of the resistance of the spring and consequently the instrument 17 may be calibrated so as to read directly to show the height of the liquid in the tank or the number of gallons therein.

Fig. 4 shows a method of measurement in which fluctuations of the battery potential do not introduce errors in the reading of the indicator. The meter 11 is so constructed that the deflection is a function of the currents through it, or the voltage as applied to two movable coils, the planes of which are not parallel. These coils form the rotative system of the meter. In this method, a fixed resistance 19' is inserted in the circuit and the potential drop across both this resistance and the variable resistance of the spring are translated by the meter so as to indicate the liquid level in terms of the ratio of these resistances without being affected by variations in battery potential, the readings of the instrument being given in terms of gallons or in linear measurements. In Fig. 3 is shown an electrical method of connecting which is similar to that shown in Fig. 4 except that the ratio of two variable resistances is utilized. These two variable resistances are the upper and lower parts of the spring 7, the ends of the spring in such case being insulated from the tube 1 and the container walls.

It will be evident that the tube provides a closed chamber within which the variable contact is made, and any sparking liable to occur at that point is shielded from the liquid within the container. The spring serves as a combined magnetic armature, variable resistance, and electrical contact.

I am aware that various changes and modifications of my invention may be made, and I do not desire to be limited to the exact construction shown, and descried herein for purposes of illustration. I desire to have it understood that such changes may be made when desired as are in the scope of the following claims appended hereto. Having thus described and shown my invention,

I claim:—

1. A float controlled rheostat comprising a casing, an elongated magnetic element mounted vertically therein under tension and separated at both ends from said casing and a magnetic float outside of said casing for controlling the effective resistance of said element.

2. A float controlled rheostat comprising a liquid tight casing, a magnetic element extending from end to end of said casing, and a magnetic float outside of said casing for controlling the effective resistance of said element.

3. In a device of the class described, a vertically elongated casing, a magnetic element mounted vertically therein and extending substantially from end to end of said casing and a magnet outside of said casing and vertically guided thereby for controlling the effective resistance of said element.

4. In a device of the class described, a liquid tight casing, a magnetic helical spring mounted vertically therein, and a magnetic float outside of said casing and vertically guided thereby, for causing the spring to contact with said casing adjacent said float for the purpose described.

5. A float controlled rheostat comprising a casing, a magnetic helical spring mounted therein and a magnetic float outside of said casing for causing the spring to contact with the casing adjacent said float to control the effective resistance of said spring.

6. A float controlled rheostat comprising a metallic casing, an upright elongated magnetic tensioned element mounted longitudinally therein, and a magnetic float outside of said casing for causing the element to contact with the casing adjacent said float for the purpose described.

7. A float controlled rheostat comprising a liquid tight casing formed of electrical conductive material, a magnetic tensioned element extending longitudinally within said casing, a float extending around said casing to be guided thereby for vertical movement, a permanent magnet supported upon said float, and having its two opposite poles on the same side of the casing whereby the position of said float varies the position of contact between said element and said casing for the purpose described.

8. A float controlled rheostat comprising an elongated liquid tight metallic casing, a magnetic tensioned element extending longitudinally thereof and attached thereto at each end, means for adjusting and setting the tension of said element, and a float bearing a permanent magnet outside of said casing and vertically guided by said casing for causing the said element to contact with said casing at various points along its length dependent upon the position of said float.

9. In a device of the class described as set forth in claim 4, means for adjusting the tension of said spring comprising an adjustable threaded member adjustably mounted in the end of said casing and attached to one end of said spring.

10. A float controlled rheostat as set forth in claim 1, together with a vibration damping liquid in said casing.

11. A float controlled rheostat as set forth in claim 5, said casing containing a vibration damping liquid therein.

In testimony whereof I affix my signature.

MARK H. REDMAN.